US 11,648,673 B2

(12) United States Patent
Beardsworth (10) Patent No.: US 11,648,673 B2
(45) Date of Patent: May 16, 2023

(54) AUTOMATED SAFETY PROCEDURES FOR HUMAN INTERVENTION IN ROBOT SYSTEMS

(71) Applicant: Intrinsic Innovation LLC, Mountain View, CA (US)

(72) Inventor: Michael Beardsworth, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 330 days.

(21) Appl. No.: 16/883,895

(22) Filed: May 26, 2020

(65) Prior Publication Data

US 2021/0370514 A1 Dec. 2, 2021

(51) Int. Cl.
*B25J 9/16* (2006.01)
*B25J 19/02* (2006.01)
*B25J 19/00* (2006.01)

(52) U.S. Cl.
CPC ............. *B25J 9/1674* (2013.01); *B25J 9/161* (2013.01); *B25J 9/1633* (2013.01); *B25J 9/1651* (2013.01); *B25J 19/0025* (2013.01); *B25J 19/0066* (2013.01); *B25J 19/02* (2013.01); *G05B 2219/40202* (2013.01)

(58) Field of Classification Search
CPC ........ B25J 9/1674; B25J 9/161; B25J 9/1633; B25J 9/1651; B25J 19/0025; B25J 19/0066; B25J 19/02; B25J 19/066; G05B 2219/40202; G05B 2219/40204
See application file for complete search history.

(56) References Cited

U.S. PATENT DOCUMENTS

| | | | |
|---|---|---|---|
| 6,778,867 B1 * | 8/2004 | Ziegler | B25J 9/1674 |
| | | | 318/563 |
| 8,249,747 B2 | 8/2012 | Kock | |
| 8,588,975 B2 | 11/2013 | Komuro et al. | |
| 8,855,812 B2 | 10/2014 | Kapoor | |
| 9,866,664 B2 | 1/2018 | Sinha et al. | |
| 10,399,232 B2 | 9/2019 | Oestergaard et al. | |
| 10,521,625 B2 * | 12/2019 | Takeshima | H04N 5/247 |
| 10,872,514 B1 * | 12/2020 | Glatfelter | G08B 21/18 |
| 2003/0050734 A1 * | 3/2003 | Lapham | G06F 30/00 |
| | | | 700/245 |
| 2011/0010010 A1 | 1/2011 | Kai et al. | |
| 2014/0067124 A1 * | 3/2014 | Williamson | B25J 9/1653 |
| | | | 700/258 |
| 2014/0163730 A1 * | 6/2014 | Mian | B25J 9/16 |
| | | | 700/248 |
| 2017/0144307 A1 * | 5/2017 | Rublee | B25J 9/1694 |
| 2018/0222052 A1 * | 8/2018 | Vu | B25J 9/1666 |

* cited by examiner

*Primary Examiner* — Abby Y Lin
*Assistant Examiner* — Dylan M Katz
(74) *Attorney, Agent, or Firm* — Fish & Richardson P.C.

(57) ABSTRACT

Methods, systems, and apparatus, including computer programs encoded on computer storage media, for performing automated safety procedures for a robot. One of the methods includes receiving, by a robotic control system for a robot, a request to execute an automated safety procedure by a safety control subsystem for the robot. Each step of the automated safety procedure is iterated until an end of the automated safety procedure is reached, including if a step requires a new safety configuration, a respective safety configuration for the step is obtained and activated before performing one or more automatic actions for the step.

21 Claims, 3 Drawing Sheets

AUTOMATED SAFETY PROCEDURES FOR HUMAN INTERVENTION IN ROBOT SYSTEMS

BACKGROUND

This specification relates to robotics, and more particularly to safety control systems for robots.

Robotics control systems are software control systems that control robots and actively monitor their operation to detect fault states. For example, a robotics control system can be a real-time control system that must execute certain operations within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The use of fault states is often designed to improve user safety. For example, when humans work in close proximity to massive and high-energy industrial robots, malfunctions in the control software can result in serious injury. Thus, halting operation when a fault state is reached can reduce the risk of injury due to errors in the control software.

It is, however, inevitable that human operators need to come into close proximity with robots that are powered on, which typically occurs during maintenance procedures. For example, if a bearing or a joint requires lubrication, a human must typically enter the workcell in close proximity to the robot to perform the lubrication maintenance.

Some robots are equipped with safety mechanisms that must be engaged during such maintenance. Human operators are thus trained to engage a safety mechanism on the robot that allows actions that are required for maintenance to be performed while forbidding normal industrial operation. For example, a particular safety process can require a human operator to press a designated button on a robot control device, which can in effect turn off power for all but one component of the robot that needs to be moved to perform the lubrication maintenance. To put the robot back into normal operation, the human operator can disengage the safety mechanism.

SUMMARY

This specification generally describes how a robotic control system can use an independent and parallel safety control subsystem having a software framework that allows for encoding automated safety procedures requiring one or more special safety configurations. This allows a robot to perform automated safety procedures that enhance user safety, for example, when human intervention is required or when performing tasks requiring humans to work in close proximity to a robot.

Particular embodiments of the subject matter described in this specification can be implemented so as to realize one or more of the following advantages. Providing a software framework for encoding automated safety procedures enhances the safety of humans working in close proximity to robots, particularly for custom robot installations that may have multiple robots. These mechanisms make setting up and operating safe robot installations more scalable. These techniques also allow for less-trained technicians to safely perform maintenance procedures on robots. The framework also provides for extending the safety control subsystem with additional custom mappings between detections and reactions, and allows for customized detections and customized reactions to be integrated into the system. These advantages make industrial robot installations more accessible and safer for more entities that desire to have robot installations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a robotic control system having an independent and parallel safety control subsystem that has a software framework providing the ability to automatically execute automated safety procedures that require special safety configurations. In this specification, robot configuration is a representation of the operating parameters for the software control system of a robot, and a special safety configuration is a robot configuration that differs from a configuration used for normal robot operation. Special safety configurations often result in one or more of disabling power, disabling components, or requiring elevated user permissions for operation.

In this specification, an automated safety procedure is one or more software modules that when executed iterate over a sequence of steps and that automatically enable one or more special safety configurations during the sequence of steps. An automated safety procedure thus means that the robot will operate using at least one special safety configuration that is not enabled during normal operation.

An automated safety procedure can also have an associated user interface. For example, the user interface can include a presentation that prompts a user to perform one or more actions at each of one or more steps in the sequence, e.g., lubricating a joint or standing in a specific location. The user interface can also include hardware devices that must be operated, for example, requiring a user to operate a two-hand switch.

However, some steps in the sequence can be automatically performed by the robot, e.g., moving to a particular maintenance position.

This software framework thus allows for a robot installation to encode automated safety procedures that are recommended by a manufacturer. This framework also allows a robot installation to execute custom safety procedures that modify or augment such manufacturer recommendations. This allows for the implementation of custom safety procedures that are developed by a manufacturer entity or non-manufacturer entities of the robot. For example, an integration entity who is responsible for setting up a robot installation at a facility can develop a custom safety procedure that is particular to the arrangement of robots in a workcell. This framework is beneficial because while robot manufacturers typically have great expertise in individual robot models, they often have no visibility into how the robots are actually installed, nor do they typically have the resources required to develop customized automated safety procedures that are particular to every customer who purchases a robot. Moreover, robot manufacturers have no visibility into many other controlled hardware in a workcell beyond the robot, e.g., positioners, end effector tooling, or conveyors, to name just a few examples. These components can all be included in a custom safety procedure.

Similarly, an operator entity that operates the robot installation can also develop a custom safety procedure that is particular to the operator entity. For example, the custom safety procedure can take into consideration relationships between employees by requiring supervisory signoff on some steps of the custom safety procedure, which are considerations that neither a manufacturer or an integration entity would have access to or knowledge of.

This software framework also provides the ability to implement customized mappings between detections and reactions. In addition, the detection and reaction routines themselves can be customized software modules. For example, if an operator entity acquires a new sensor that can very accurately detect the presence of humans in a workcell, the operator entity can use the safety framework to directly utilize the new sensor in the automated safety procedures of the robot.

Figure 1:
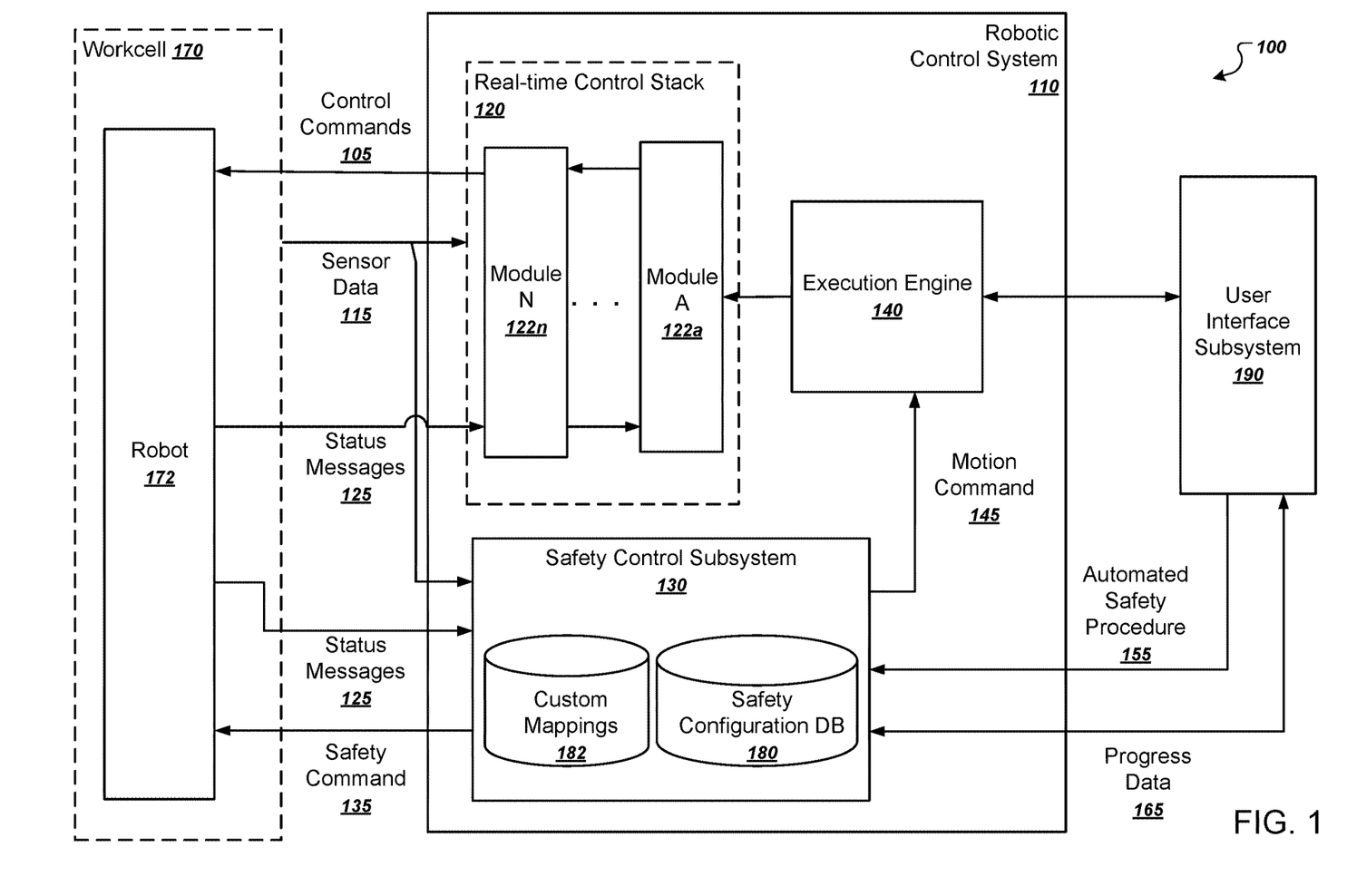
FIG. 1 is a diagram that illustrates an example system.

FIG. 1 is a diagram of an example system 100. The system 100 is an example of a robotics control system that can implement the techniques described in this specification. The system 100 includes a number of functional components that can each be implemented as computer programs installed on one or more computers in one or more locations that are coupled to each other through any appropriate communications network, e.g., an intranet or the Internet, or combination of networks.

The system 100 includes a robotic control system 110 that controls a robot 172 in a workcell 170. The robotic control system 110 includes an execution engine 140 that can be used to determine high level actions to be taken by the robot.

The execution engine 140 can provide commands through a control stack 120 that handles providing control commands 105 to the robot 172. The control stack 120 can be implemented as a hardware-agnostic software stack that is at least partially hardware-agnostic. In other words, the software stack can accept as input commands generated by the execution engine 140 without requiring the commands to relate specifically to a particular model of robot or to a particular robotic component.

The control stack 120 includes multiple levels, with each level having a corresponding software module. In FIG. 1, the lowest level is module N 122n, and the highest level is Module A 122a. The levels of the control stack 120 generally feature increasing hardware specificity in one direction and increasing software abstraction in the other direction. The control stack 120 ultimately drives robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command 105 indicating an amount of torque that should be applied. In response to receiving the command, the motor can report a status message 125 specifying a current position of a joint of the robot, e.g., using an encoder, to a higher level of the software stack. As another example, the control stack 120 can directly receive sensor data 115 generated by one or more sensors in the workcell 170, which may or may not be physically coupled to the robot 172. For example, the sensor data 115 can be generated by an arm-mounted camera or a wall-mounted camera.

Each next highest level in the software stack can implement an interface that supports multiple different underlying implementations. In general, each interface between levels provides status messages from the lower level to the upper level and provides commands from the upper level to the lower level. Typically, the commands and status messages are generated cyclically during each control cycle, e.g., one status message and one command per control cycle. Lower levels of the software stack generally have tighter time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot 172 can be configured to enter a fault state, e.g., by freezing all operation.

The robotic control system 110 also includes a safety control subsystem 130. The safety control subsystem 130 is a control system that is independent of and parallel to the control stack 120. The safety control subsystem 130 can execute on hardware that is separate from the hardware used to execute the control stack 120 so that the safety-enhancing functionality of the safety control subsystem 130 continue to operate even if there are application, operating system, or hardware failures in the control stack 120. The safety control subsystem 130 also typically has an independent communications pathway for issuing fault tolerance commands 135 to the robot 172.

The safety control subsystem 130 can receive sensor data 115, status messages 125, or both in order to determine whether the robot is in compliance with a particular safety configuration.

In normal operation, the safety control subsystem 130 can continually monitor conditions in the workcell to perform fault tolerance procedures. Each fault tolerance procedure is defined by a mapping between one or more detections and one or more corresponding reactions. For example, the safety control subsystem 130 can monitor for various fault conditions, e.g., unsafe positions, velocities, or orientations, that might cause injury to a human or damage to the robot itself. Fault conditions can also include failed redundancy checks that indicate that one or more redundant components is not in nominal operation.

If any of such fault conditions occur, the safety control subsystem 130 can issue a corresponding fault tolerance command 135 to which the fault condition is mapped. Issuing the fault tolerance command 135 to the robot 172 can thus mitigate the risks associated with the condition. For example, the fault tolerance command 135 can cause all power to be cut to the robot or otherwise halt robot operation completely. The fault tolerance command 135 can also cause less drastic changes, e.g., by slowing a velocity of a robot component.

The safety control subsystem 130 can execute in real-time, e.g., by monitoring conditions in the workcell 170 on each control cycle to detect unsafe conditions. The safety control subsystem 130 can thus have a parallel implementation of some or all levels of the control stack 120, or the safety control subsystem 130 can utilize some or all levels of the control stack 120 as an interface to controlling the robot 172. For less urgent planning, the safety control subsystem 130 can also issue motion commands 145 to the execution engine 140 for scheduling.

The safety control subsystem 130 also provides a software framework that provides for executing automated safety procedures. As described above, an automated safety procedure is a procedure that is executed by one or more components of the robotic control system 110 outside of its normal operation, and which requires the activation of one or more special safety configurations.

As one example, special safety configurations can relate to permitted robot motions. For a special safety configuration can change limits on robot movement, e.g., the limits on joint or Cartesian positions, velocities, accelerations, jerks, torques, or forces to name just a few examples. A special safety configuration can also switch certain preinstalled modes of certain robot components. For example, a particular servo on the robot can have different preinstalled modes for normal operation and maintenance operation. Thus, the special safety configuration can include a representation of the component's operating mode, rather than actual values for velocity.

As another example, special safety configurations can relate to workcell spaces. For example, a special safety configuration can alter the exclusion zones in a workcell into which humans are not permitted. Similarly, a special safety configuration can alter the permitted zones that humans are allowed to enter.

As another example, special safety configurations can relate to enabled sensors. For example, a special safety configuration can alter which sensors are being used or how they are being used. For example, a special safety configuration can activate a camera, light curtain, laser area scanner, vision subsystem, or another type of sensor. The activated sensor can be one that is not used or that is idle during normal operation. As another example, a special safety configuration can alter the type of data that a sensor is capturing, e.g., changing a camera to operate in color rather than black and white.

The safety control subsystem 130 can store different safety configurations in a safety configuration database 180. During execution of an automated safety procedure, the safety control subsystem 130 can then automatically obtain and activate each safety configuration before performing the steps of the automated safety procedure.

As described above, the automated safety procedures can be used to enhance the safety of humans working in close proximity to the robot 172, e.g., performing maintenance on the robot 172. During this process, the safeguards provided by the safety control subsystem 130 are equally or more important than when the robot 172 is in normal operation. Thus, the functionalities of the safety control subsystem 130 can remain fully operational while executing an automated safety procedure. On the other hand, some or all components of the control stack 120 can be disabled during this process.

As one example, switching to a special safety configuration can drastically lower the permitted velocities of a robot arm of the robot 172 to far below the velocities that are allowed during normal operation. Therefore, for example, if during maintenance the velocity of the robot arm exceeds the lower threshold, the safety control subsystem 130 can issue a fault tolerance command 135 to cut power to the robot 172 or decrease the velocity of the robot arm. As another example, a special safety configuration can allow for access panels on the robot to be opened without causing a fault. Such access panels being opened during normal operation can trigger safety interlocks that cause the safety control subsystem 130 to halt robot operation.

The system 100 can also include a user interface subsystem 190, which can be implemented using any appropriate computing device, e.g., a desktop computer, a laptop computer, a tablet computer, or a smartphone. While executing an automated safety procedure, the safety control subsystem 130 can provide progress data 165 that provides information about the progress of the automated safety procedure. The user interface subsystem 190 can generate a user interface presentation reflecting the progress data.

The progress data 165 can also cause the user interface subsystem 190 to prompt a user to perform one more manual actions for a particular step of the automated safety procedure. For example, the user interfaces subsystem 190 can use the progress data 165 to generate a user interface presentation that prompts the user to apply lubrication or open an access panel.

The user interface subsystem 190 can also be used to install an automated safety procedure 155. To do so, a user can use the user interface subsystem 190 to provide a sequence of steps and corresponding special safety configurations that are required to effectuate the automated safety procedure 155. The safety control subsystem 130 can then store, in the safety configuration database 180, a mapping between each of the steps of the automated safety procedure 155 and each special safety configuration.

The software framework of the safety control subsystem 130 also provides the ability for users to define custom mappings 182. Each custom mapping is a mapping between a particular detection and a particular safety reaction.

The detection routines can be based on preexisting software routines, e.g., those for detecting unsafe velocities. Or the detection routines can be user-defined custom detection routines. For example, the operators of the robot 172 can install a new sensor in the workcell 170. To integrate the new sensor into the safety mechanisms of the safety control subsystem 130, the operators need only to define a custom mapping between a detection by the new sensor and a corresponding safety reaction.

Then, during operation, either normal operation or during execution of an automated safety procedure, the safety control subsystem 130 will automatically check the custom mappings 182 in order to determine whether a particular safety reaction should be executed. If so, the safety control subsystem 130 can issue a fault tolerance command 135 corresponding to the safety reaction in the custom mappings 182. The safety reaction itself can also be a custom safety reaction that is user-defined. For example, a custom safety reaction can specify that the robot slow down and move to a home position if a user is detected in the workcell 170 during normal operation.

Figure 2:
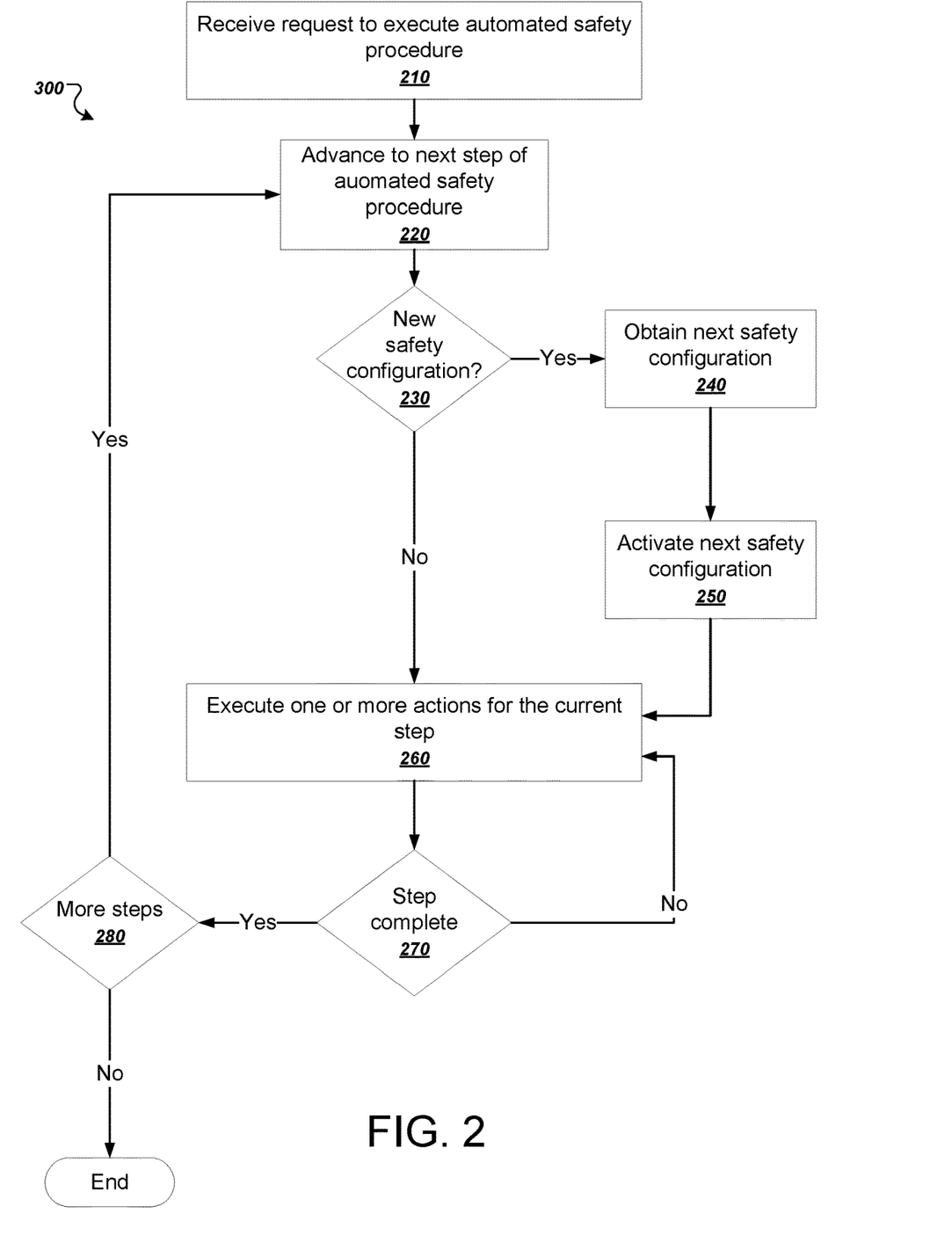
FIG. 2 is a flowchart of an example process for executing an automated safety procedure.

FIG. 2 is a flowchart of an example process for executing an automated safety procedure. The process can be executed by a system of one or more computers appropriately programmed in accordance with this specification, e.g., the safety control subsystem 130 of FIG. 1. For convenience, the process will be described as being performed by a system of one or more computers.

The system receives a request to execute an automated safety procedure (210). The request can specify, implicitly or explicitly, a particular automated safety procedure. In some implementations, the system can present a graphical user interface that lists available automated safety procedures and can receive a user selection through the graphical user interface of the automated safety procedure to be executed. The system can also receive the user selection through a dedicated hardware interface, e.g., a button on the robot or an interface associated with the robot, e.g., a teach pendant.

The system can then iterate through the steps of the automated safety procedure. To do so, the system can activate a special safety configuration for each of one or more steps.

Thus, the system advances to the next step of the automated safety procedure (220). As described above, each step of the automated safety procedure defines one or more actions to be executed automatically by the system. And each step of the automated safety procedure specifies, explicitly or implicit, a safety configuration.

The system determines whether the current step requires a new safety configuration (230). If so, the system obtains a next safety configuration (branch to 240) and activates the next safety configuration (250). As described above, the system can maintain a safety configuration database that associates one or more steps of each automated safety procedure with a safety configuration. If the safety configuration has changed relative to the previous step of the process, the system can automatically change the safety configuration of the robot.

For example, the safety configuration can enable or disable one or more components, enable or disable power to the robot, modify safety thresholds for robotic movement, modify permitted or disallowed locations within the workcell that the robot can occupy, modify who is permitted or required to perform that step of the automated safety procedure, permit or deny access to one or more portions of the robot, e.g., or modify whether one or more other users must sign off on that step of the automated safety procedure, to name just a few examples.

After the required safety configuration has been confirmed to be activated, the system then automatically executes one or more actions for the current step of the automated safety procedure (260). The actions of the automated safety procedure can automatically move the robot to a new location; alter a current movement of the robot, e.g., slow down or speed up.

The actions of the automated safety procedure can also include prompting a user to manually perform one or more actions of the automated safety procedure, e.g., by presenting information describing the manual actions on a graphical user interface.

The actions of the automated safety procedure can also include performing user authentication and authorization associated with the step of the automated safety procedure. For example, if a step of the specify safety procedure requires supervisory signoff, the system can wait for a supervisor to authorize the step being performed by a technician before allowing other actions of the step to be executed.

The automatic actions of the special safety configuration can also include writing action results to an audit log. This allows for automatic auditing of automated safety procedures, e.g., recording which users attempted to perform which steps or which automated safety procedures. This functionality can greatly enhance the safety of a particular operation by allowing for automatically identifying when users who have not received adequate training are attempting to perform special procedures with potentially dangerous equipment.

If the actions of the step are not completed (270), the system can re-perform some actions (branch back to 260). For example, the actions can require the system to verify performance of some of the manual actions, e.g., opening an access panel. If the required manual actions have not been performed, the system can again execute one or more actions of the current step, e.g., re-prompting the user to open the access panel.

If the actions of the step are completed (270), the system determines whether there are more steps of the automated safety procedure (280). If so, the system advances to the next step of the automated safety procedure (branch to 220). If not, the process ends (branch to end).

Figure 3:
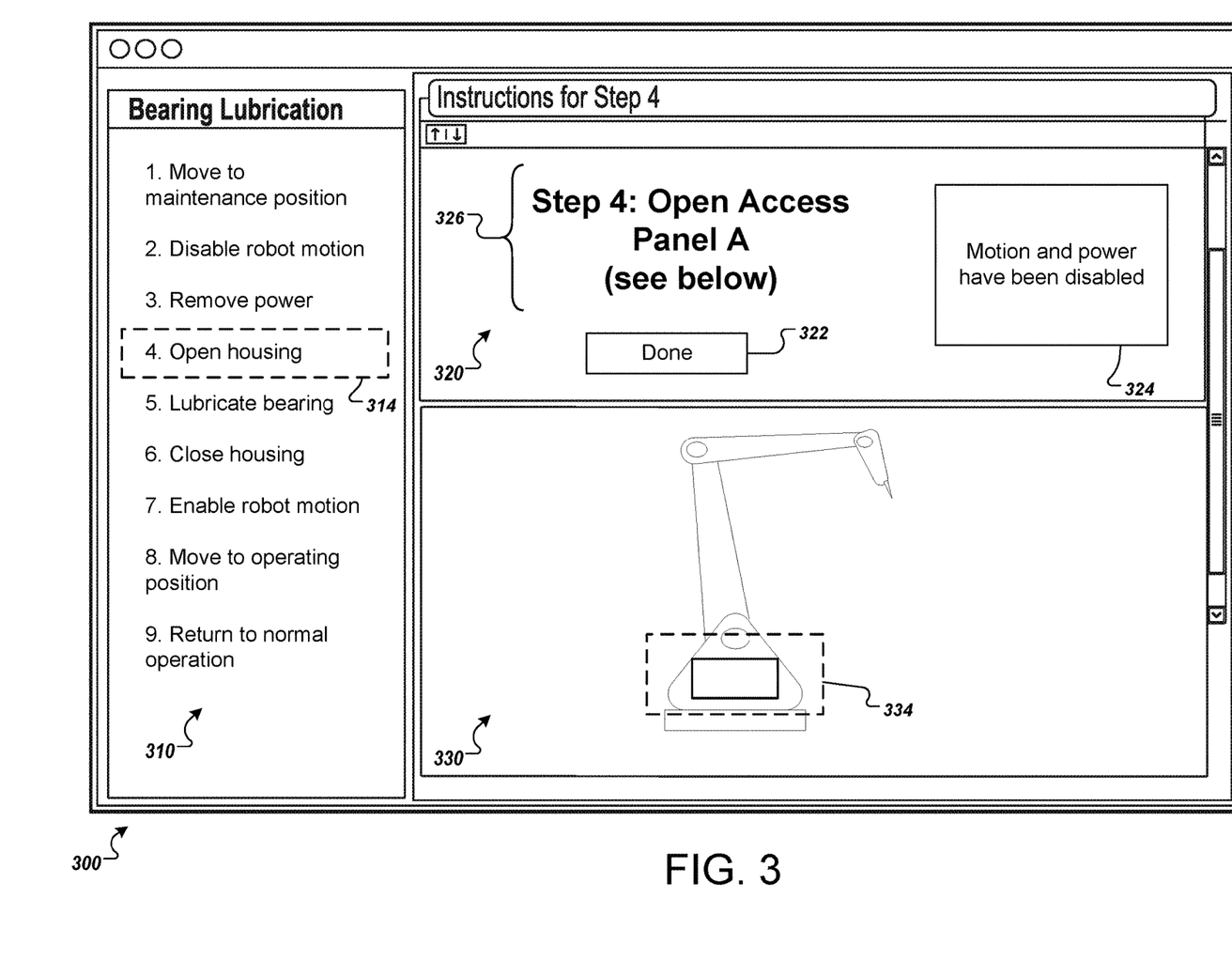
FIG. 3 is a diagram of an example user interface presentation.

FIG. 3 is a diagram of an example user interface presentation 300. The user interface presentation 300 is an example of a graphical user interface can be displayed by a user interface device, e.g., the user interface subsystem 190 of FIG. 1.

The user interface presentation includes a progress pane 310, an instructions pane 320, and an illustration pane 330.

While executing a automated safety procedure, the safety control subsystem can provide progress data to the user interface device in order to populate the user interface presentation 300. The progress data can include a current step of the automated safety procedure, which can be used to populate the progress pane 310. As shown in the progress pane, the current automated safety procedure, named "Bearing Lubrication," has the following steps:

1. Move to maintenance position
2. Disable robot motion
3. Remove power
4. Open housing
5. Lubricate bearing
6. Close housing
7. Enable robot motion
8. Move to operating position
9. Return to normal operation The progress pane 310 also includes a visual highlight 314 around the current step of the automated safety procedure. In this example, the progress pane 310 lists all steps of the automated safety procedure, even those that are performed automatically by the control system. In some implementations, the system need not present information about the steps that are performed automatically, and might only present information about steps that require manual action by the user.

In this example, steps 1-3 and 7-9 are steps that require no manual user actions to be completed. On the other hand, steps 4-6 are all steps that require a user to perform some physical manual action on the robot.

The instructions pane 320 includes a prompt 326 that instructs a user to perform some kind of manual action on the robot. In this example, the prompt 326 instructs the user to open an access panel. The instructions pane can also include automatic action information 324 that informs the user about one or more automatic actions that have been taken, which can provide assurance to the user that the associated special safety configurations have been implemented. The instructions pane 320 can also include a user interface element 322 for advancing to the next step of the automated safety procedure. Alternatively or in addition, the system can automatically determine when the actions have been completed and can thus automatically advance to the next step of the automated safety procedure.

The illustration pane 330 provides a graphic to aid the user in performing the manual action associated with the current step of the automated safety procedure. In this example, the illustration pane 330 includes a highlight 334 on an image of the robot to indicate where the access panel is located.

Additional details of an example software control stack will now be described. Above the lowest-level components, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving, by a robotic control system for a robot, a request to execute an automated safety procedure by a safety control subsystem for the robot, wherein the automated safety procedure specifies one or more steps, and, for each step of the one or more steps, one or more actions to be executed automatically by the safety control subsystem, and wherein the safety control subsystem stores a mapping between one or more steps of the safety control subsystem and a respective special safety configuration;
  iterating over each step of the automated safety procedure until an end of the automated safety procedure is reached, including:
    determining whether the step requires a new safety configuration,
    obtaining, from the mapping, a respective safety configuration for the step whenever the step requires a new safety configuration,
    activating the respective new safety configuration for the step, and
    performing one or more automatic actions for the step.

Embodiment 2 is the method of embodiment 1, wherein performing one or more automatic actions comprises prompting a user to perform one or more manual actions on the robot for the step.

Embodiment 3 is the method of embodiment 2, wherein prompting the user to perform one or more manual actions comprises generating a user interface presentation that specifies the one or more manual actions to be performed by the user for the step.

Embodiment 4 is the method of any one of embodiments 1-3, wherein performing one or more automatic actions comprises performing one or more movement actions on the robot that are allowed under one of the special safety configurations.

Embodiment 5 is the method of any one of embodiments 1-4, wherein performing one or more automatic actions comprises altering a movement parameter of the robot according to the special safety configuration.

Embodiment 6 is the method of embodiment 5, wherein altering a movement parameter comprises reducing a velocity, acceleration, jerk, force, or torque of a robot component according to a movement threshold defined by a special safety configuration.

Embodiment 7 is the method of any one of embodiments 1-6, wherein performing one or more automatic actions comprises requesting authorization from one or more other users before proceeding to a next step of the automated safety procedure.

Embodiment 8 is the method of any one of embodiments 1-7, wherein activating the new safety configuration for the step comprises disabling power to the robot or one or more components of the robot.

Embodiment 9 is the method of any one of embodiments 1-9, wherein activating the new safety configuration for the step comprises enabling or disabling a sensor or a type of data captured by a sensor.

Embodiment 10 is the method of any one of embodiments 1-9, wherein the robotic control system comprises a control stack that is separate and independent from the safety control subsystem.

Embodiment 11 is the method of any one of embodiments 1-10, wherein the safety control subsystem stores one or more custom mappings between detections and reactions and further comprising:
  determining that a detection for a custom mapping is satisfied; and
  in response, performing a corresponding reaction of the custom mapping.

Embodiment 12 is the method of embodiment 10, wherein the custom mapping is defined by an entity that did not manufacture the robot.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   receiving, by a robotic control system for a robot, a request to execute an automated safety procedure by a safety control subsystem for the robot, wherein the automated safety procedure specifies one or more steps, and, for each step of the one or more steps, one or more actions to be executed automatically by the safety control subsystem, and wherein the safety control subsystem stores a mapping between a plurality of steps of the safety control subsystem and a plurality of respective special safety configurations;
   iterating over each step in a sequence of steps of the automated safety procedure until an end of the automated safety procedure is reached and automatically activating a plurality of different special safety configurations during the sequence of steps, including:
      determining whether the step requires a new special safety configuration,
      obtaining, from the mapping, a respective special safety configuration for the step whenever the step requires a new special safety configuration,
      activating, in a workcell having the robot, the respective new special safety configuration for the step, and performing one or more automatic actions for the step.

2. The method of claim 1, wherein performing one or more automatic actions comprises prompting a user to perform one or more manual actions on the robot for the step.

3. The method of claim 2, wherein prompting the user to perform one or more manual actions comprises generating a user interface presentation that specifies the one or more manual actions to be performed by the user for the step.

4. The method of claim 1, wherein performing one or more automatic actions comprises performing one or more movement actions on the robot that are allowed under one of the special safety configurations.

5. The method of claim 1, wherein performing one or more automatic actions comprises altering a movement parameter of the robot according to the special safety configuration.

6. The method of claim 5, wherein altering a movement parameter comprises reducing a velocity, acceleration, jerk, force, or torque of a robot component according to a movement threshold defined by a special safety configuration.

7. The method of claim 1, wherein performing one or more automatic actions comprises requesting authorization from one or more other users before proceeding to a next step of the automated safety procedure.

8. The method of claim 1, wherein activating the new special safety configuration for the step comprises disabling power to the robot or one or more components of the robot.

9. The method of claim 1, wherein activating the new special safety configuration for the step comprises enabling or disabling a sensor or a type of data captured by a sensor.

10. The method of claim 1, wherein the robotic control system comprises a control stack that is separate and independent from the safety control subsystem.

11. The method of claim 1, wherein the safety control subsystem stores one or more custom mappings between detections and reactions and further comprising:
    determining that a detection for a custom mapping is satisfied; and
    in response, performing a corresponding reaction of the custom mapping.

12. The method of claim 10, wherein the custom mapping is defined by an entity that did not manufacture the robot.

13. The method of claim 1, wherein the plurality of different special safety configurations comprise two or more of:
    a special safety configuration that changes limits on robot movements, a special safety configuration that alters exclusion zones in the workcell into which humans are not permitted, or a special safety configuration that alters which sensors are being used or how the sensors are being used.

14. A system comprising:
    one or more computers and one or more storage devices storing instructions that are operable, when executed by the one or more computers, to cause the one or more computers to perform operations comprising:
    receiving, by a robotic control system for a robot, a request to execute an automated safety procedure by a safety control subsystem for the robot, wherein the automated safety procedure specifies one or more steps, and, for each step of the one or more steps, one or more actions to be executed automatically by the safety control subsystem, and wherein the safety control subsystem stores a mapping between a plurality of steps of the safety control subsystem and a plurality of respective special safety configurations;
    iterating over each step in a sequence of steps of the automated safety procedure until an end of the automated safety procedure is reached and automatically activating a plurality of different special safety configurations during the sequence of steps, including:
       determining whether the step requires a new special safety configuration,
       obtaining, from the mapping, a respective special safety configuration for the step whenever the step requires a new special safety configuration,
       activating, in a workcell having the robot, the respective new special safety configuration for the step, and performing one or more automatic actions for the step.

15. The system of claim 14, wherein performing one or more automatic actions comprises prompting a user to perform one or more manual actions on the robot for the step.

16. The system of claim 15, wherein prompting the user to perform one or more manual actions comprises generating a user interface presentation that specifies the one or more manual actions to be performed by the user for the step.

17. The system of claim 14, wherein performing one or more automatic actions comprises performing one or more movement actions on the robot that are allowed under one of the special safety configurations.

18. The system of claim 14, wherein performing one or more automatic actions comprises altering a movement parameter of the robot according to the special safety configuration.

19. The system of claim 18, wherein altering a movement parameter comprises reducing a velocity, acceleration, jerk, force, or torque of a robot component according to a movement threshold defined by a special safety configuration.

20. The system of claim 14, wherein performing one or more automatic actions comprises requesting authorization from one or more other users before proceeding to a next step of the automated safety procedure.

21. One or more non-transitory computer storage media encoded with computer program instructions that when executed by one or more computers cause the one or more computers to perform operations comprising:
 receiving, by a robotic control system for a robot, a request to execute an automated safety procedure by a safety control subsystem for the robot, wherein the automated safety procedure specifies one or more steps, and, for each step of the one or more steps, one or more actions to be executed automatically by the safety control subsystem, and wherein the safety control subsystem stores a mapping between a plurality of steps of the safety control subsystem and a plurality of respective special safety configurations;
 iterating over each step in a sequence of steps of the automated safety procedure until an end of the automated safety procedure is reached and automatically activating a plurality of different special safety configurations during the sequence of steps, including:
  determining whether the step requires a new special safety configuration,
  obtaining, from the mapping, a respective special safety configuration for the step whenever the step requires a new special safety configuration,
  activating, in a workcell having the robot, the respective new special safety configuration for the step, and
  performing one or more automatic actions for the step.

* * * * *